(No Model.) 5 Sheets—Sheet 1.
R. G. WOOD & P. REILLY.
MACHINE FOR JAPANNING AND ENAMELING LEATHER.
No. 357,515. Patented Feb. 8, 1887.
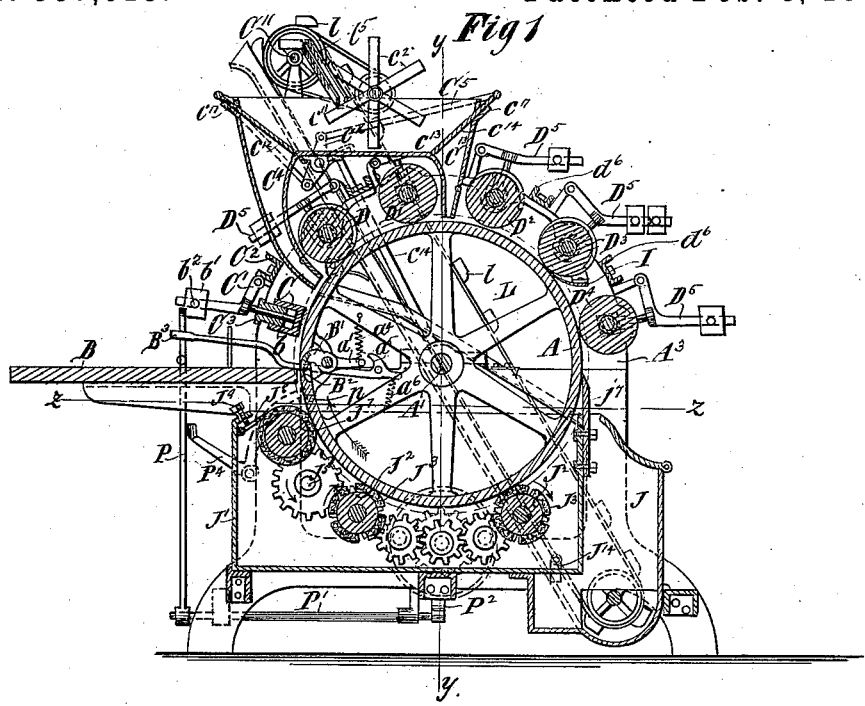
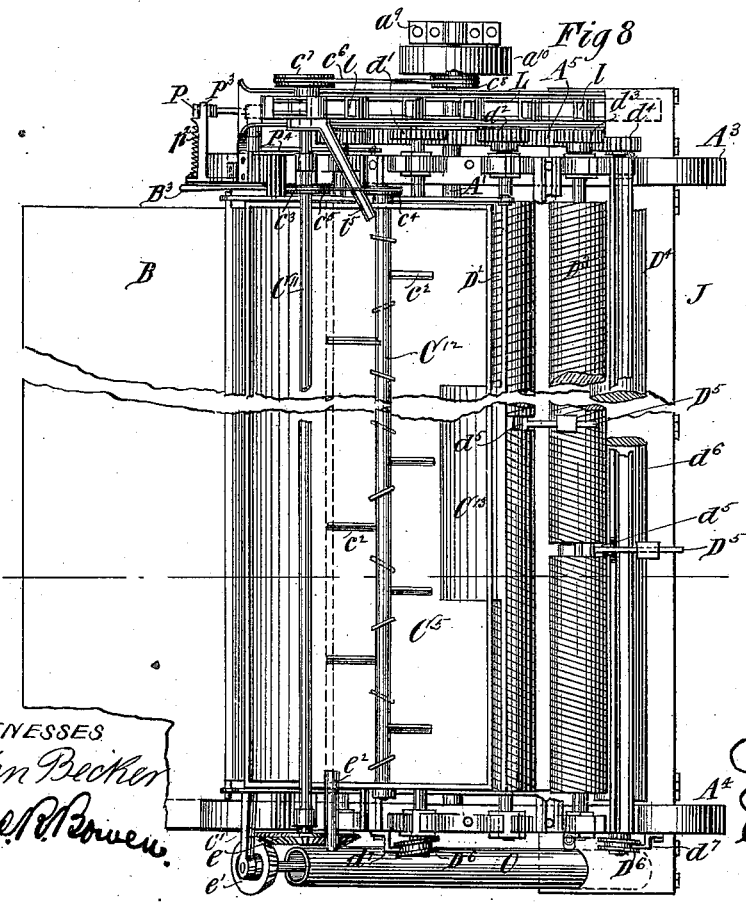

(No Model.) 5 Sheets—Sheet 2.
R. G. WOOD & P. REILLY.
MACHINE FOR JAPANNING AND ENAMELING LEATHER.
No. 357,515. Patented Feb. 8, 1887.
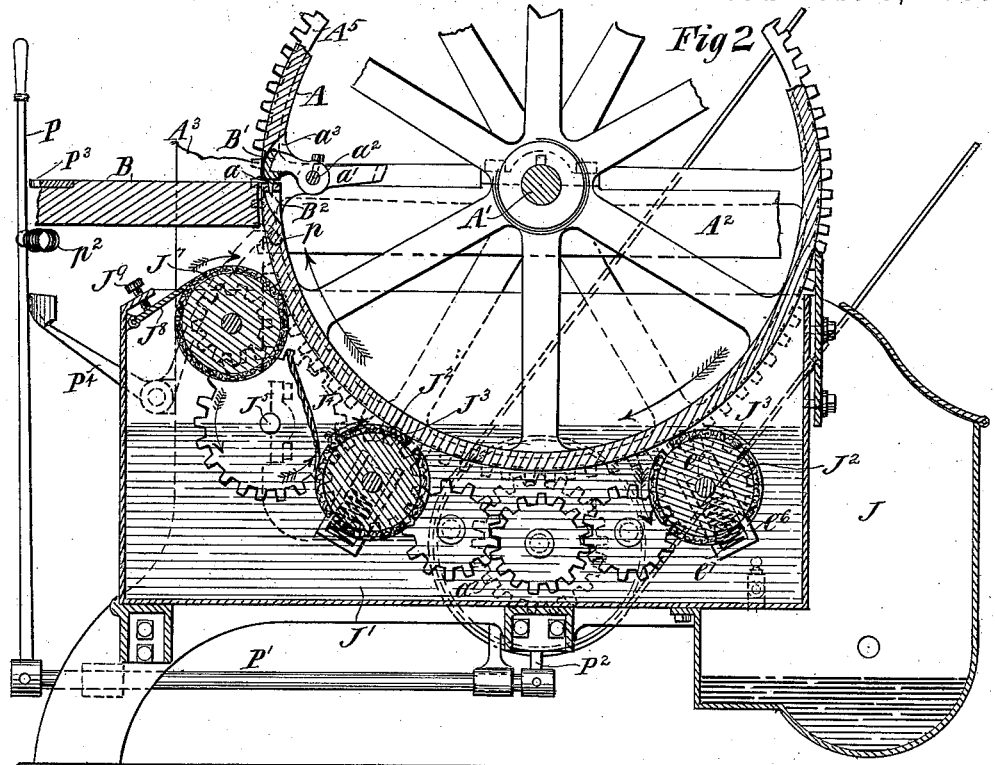
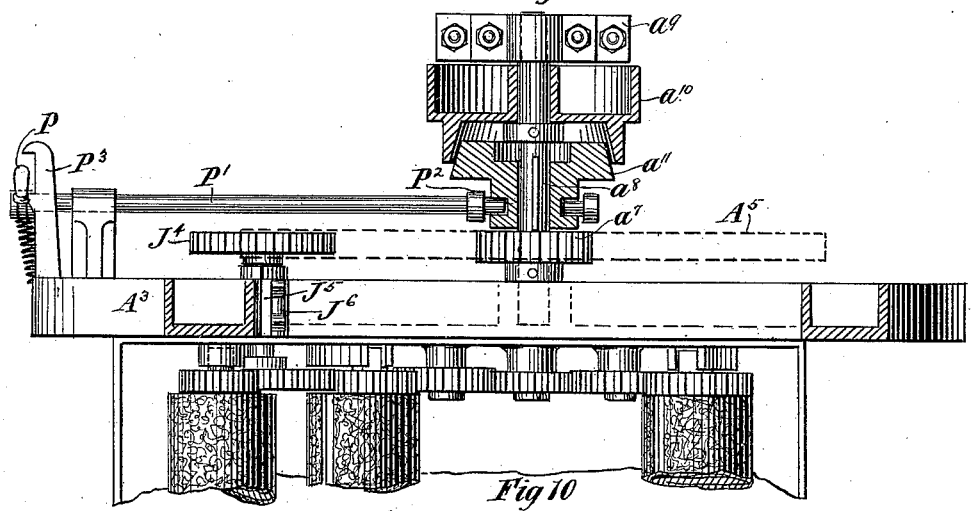
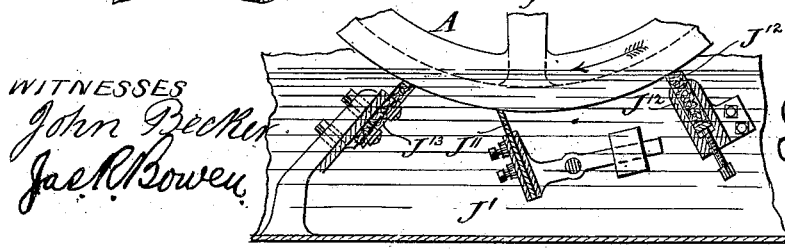

(No Model.) 5 Sheets—Sheet 3.

R. G. WOOD & P. REILLY.
MACHINE FOR JAPANNING AND ENAMELING LEATHER.

No. 357,515. Patented Feb. 8, 1887.

WITNESSES
John Becker
Jas. R. Bowen

INVENTORS
R. G. Wood
P. Reilly
by their attys (No Model.) 5 Sheets—Sheet 4.
R. G. WOOD & P. REILLY.
MACHINE FOR JAPANNING AND ENAMELING LEATHER.
No. 357,515. Patented Feb. 8, 1887.
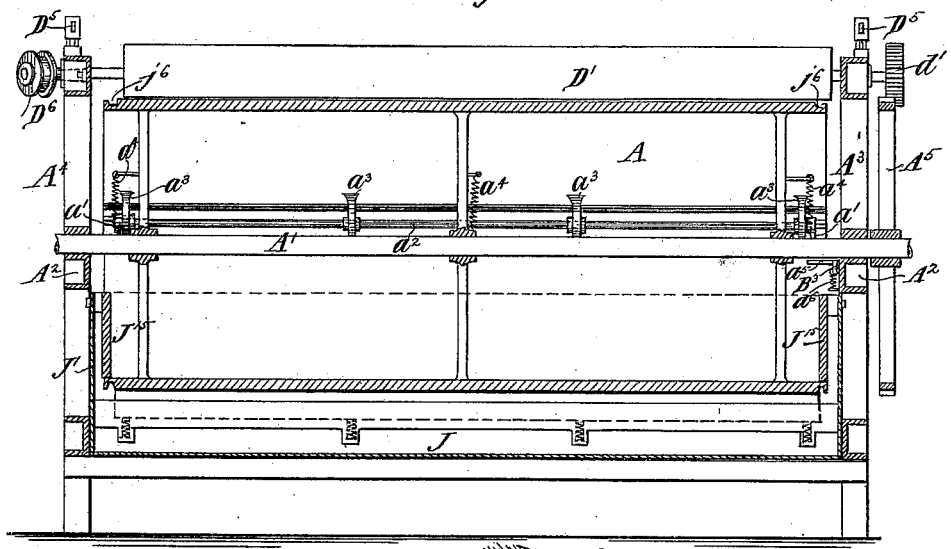
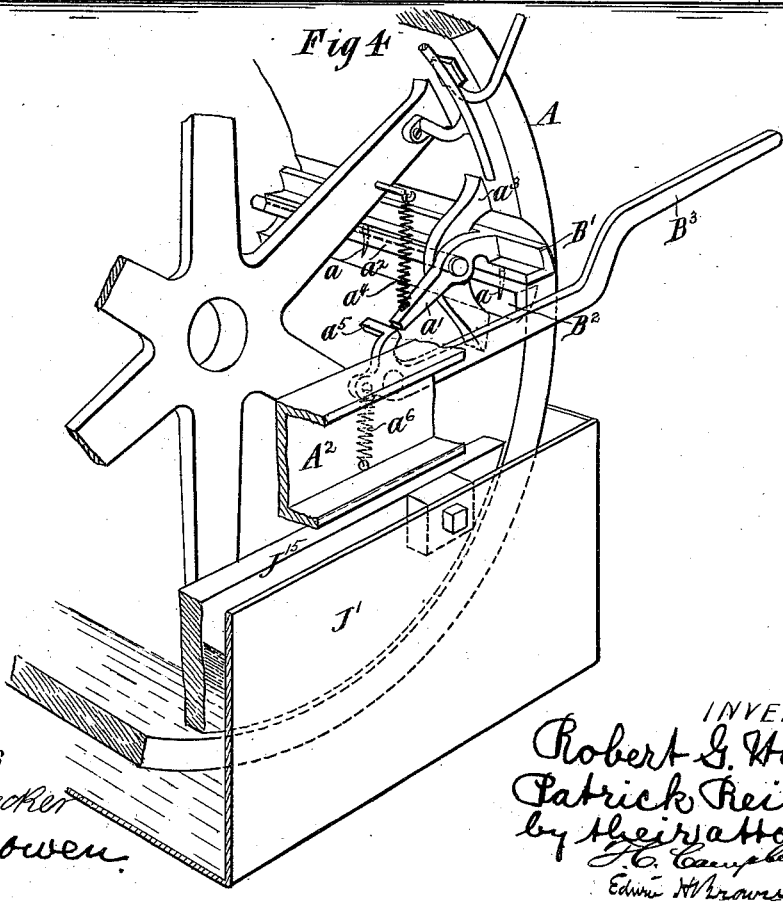

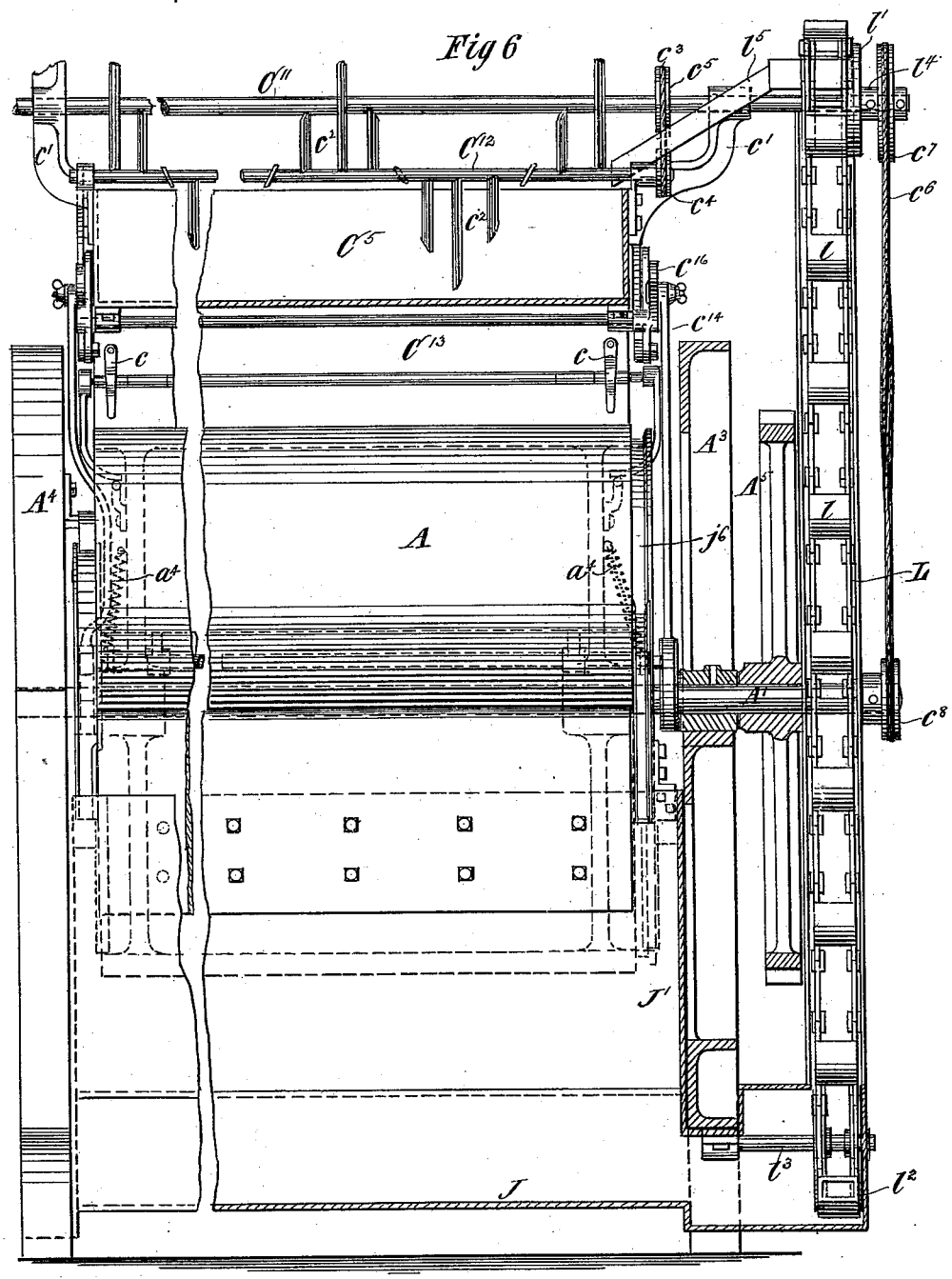

UNITED STATES PATENT OFFICE.

RICHARD G. WOOD, OF CINCINNATI, OHIO, AND PATRICK REILLY, OF NEWARK, NEW JERSEY; SAID WOOD ASSIGNOR TO SAID REILLY.

MACHINE FOR JAPANNING AND ENAMELING LEATHER.

SPECIFICATION forming part of Letters Patent No. 357,515, dated February 8, 1887.

Application filed August 21, 1886. Serial No. 211,475. (No model.)

*To all whom it may concern:*

Be it known that we, RICHARD G. WOOD, of Cincinnati, Hamilton county, Ohio, and PATRICK REILLY, of Newark, Essex county, New Jersey, have invented a certain new and useful Improvement in Machines for Japanning and Enameling Leather and Similar Material, of which the following is a specification.

We will describe a machine embodying our improvement in detail, and then point out the novel features in claims.

Figure 5:
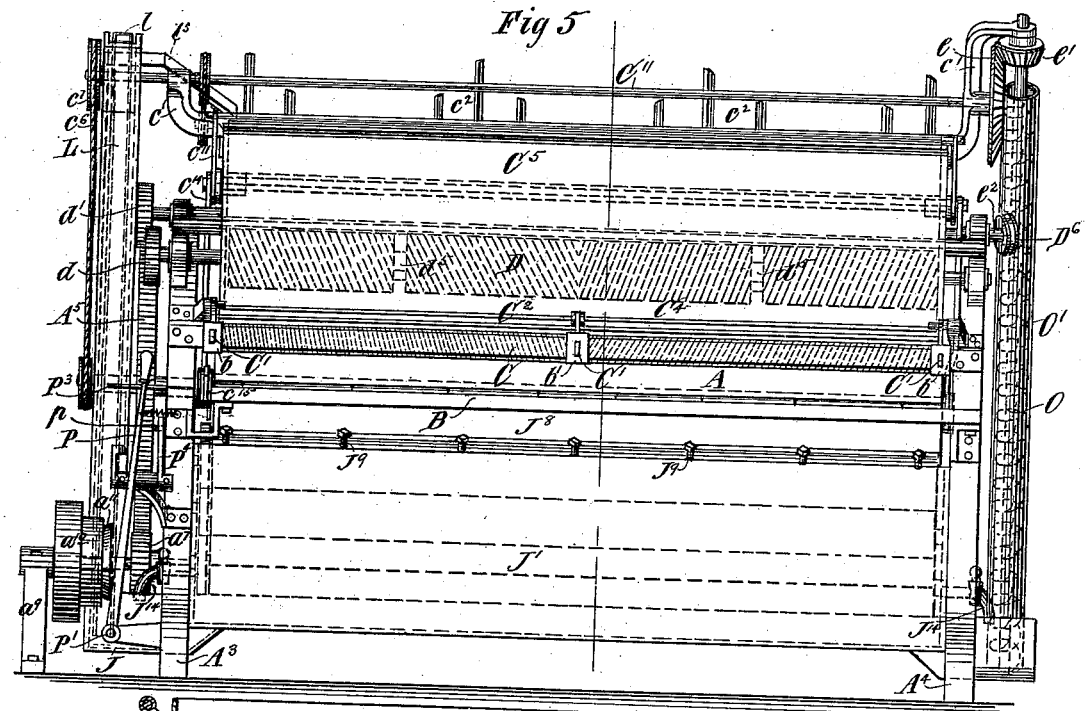
Figure 3:
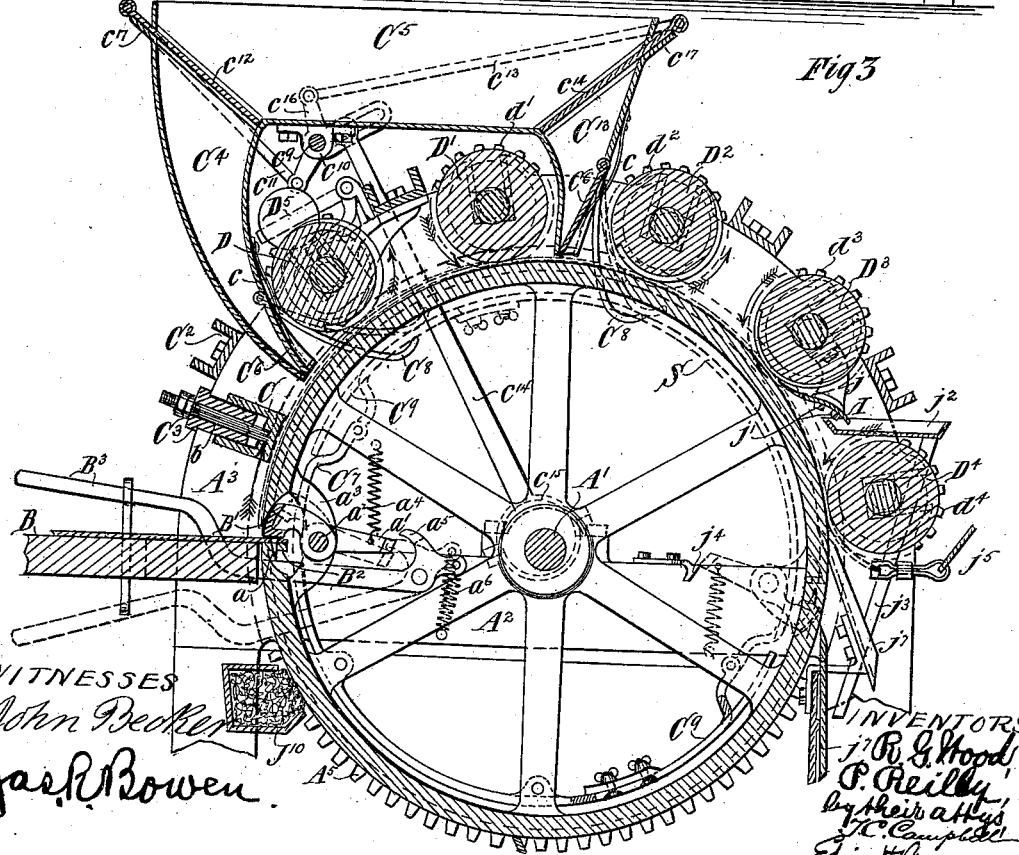

In the accompanying drawings, Figure 1 is a section of a machine embodying our improvement, taken on the plane of the dotted line $x\, x$, Fig. 5. Fig. 2 is a similar section on an enlarged scale, certain parts being broken away to save space and certain other parts being omitted. Fig. 3 is another similar section on an enlarged scale, certain parts being broken away and others omitted. Fig. 4 is a perspective, on a still more enlarged scale, of certain parts. Fig. 5 is a front elevation on the same scale as Fig. 1. Fig. 6 is a rear elevation on an enlarged scale, partly in section and partly broken away to save space. Fig. 7 is a sectional elevation on the plane of the dotted line $y\, y$, Fig. 1, certain parts being omitted to more clearly disclose other parts. Fig. 8 is a plan or top view, partly broken away, on the same scale as Fig. 1. Fig. 9 is a section, on an enlarged scale, more clearly disclosing certain parts and taken on the plane of the dotted line $z\, z$, Fig. 1. Fig. 10 is a transverse end section showing a modification of certain parts.

Similar letters of reference designate corresponding parts in all the figures.

A designates a cylinder or drum, which may be made of metal or other suitable material. This drum is keyed upon a shaft, A', journaled in suitable bearings in portions $A^2$ of a frame, $A^2\, A^3\, A^4$. Mounted upon the shaft A', outside the portion $A^3$ of the frame, is a gear-wheel, $A^5$, of large dimensions. This gear-wheel derives motion from a gear-wheel, $a^7$, mounted on a short shaft, $a^8$, journaled near one end in suitable bearings in the frame of the machine, and near the other end in a standard, $a^9$, erected on the floor or other support for the machine. As here shown, this shaft $a^8$ derives motion from a friction-clutch comprising a female portion, $a^{10}$, keyed upon said shaft, and having formed with it a pulley deriving motion from a driving-belt. This clutch also comprises a male portion, $a^{11}$, which is loosely mounted on said shaft, so as to slide to and fro thereon. The shaft is provided with a projection, and the portion $a^{11}$ of the clutch with a groove receiving the projection in such manner that the clutch will cause the shaft to rotate. This clutch is operated by mechanism hereinafter to be described.

The outer surface of the drum A is covered with leather, rubber, or other similar material of considerable frictional resistance.

In this machine a hide or other piece of leather to be japanned or enameled is fed up to the drum, where it is gripped by grippers and carried beneath rollers and other mechanism, where the process of distributing the material to be used in japanning is effected.

B designates a table, upon which the hide or piece of leather to be treated is placed to be fed up to the gripper or grippers. This table is mounted on the frame of the machine and, as shown, is stationary. In the present example of my improvement I have shown but one gripper, which is illustrated more clearly in Fig. 4. This gripper comprises a bar, B', constituting a jaw, extending lengthwise the drum and provided with downwardly-extending prongs or teeth $a$, which prongs or teeth are adapted to pierce the hide or other leather near the edge, and so obtain a firm hold upon it. The bar B' is arranged inside the outer circumference of the drum, as shown, and is provided with an arm, $a'$, extending rearwardly therefrom. A shaft, $a^2$, journaled in bearings $a^3$ on the drum, extends parallel with the gripper-bar B' and through apertures in the arm $a'$, said arm, and consequently the gripper-bar B', being pivoted on the shaft $a^2$. A spring, $a^4$, secured at one end to the rearwardly-extending end of the arm $a'$ and at the other end to a hook or projection on one of the spokes of the drum, tends to cause the gripper-bar to grip the leather. Beneath the jaw B' is a stationary jaw, $B^2$, also extending lengthwise the drum and provided with suitable apertures, into which extend the teeth $a$ on the jaw B', where the latter rests upon the jaw B².

When it is desired to open the gripper to insert a piece of leather we make use of a lever, B³, fulcrumed upon the portion A² of the frame. The long arm of this lever extends outwardly beyond the circumference of the drum, and is to be operated by hand. Near its inner end it is provided with a portion curved around and having a projection, $a^5$, which extends into such position that when the long arm of the lever is depressed the projection $a^5$ will ride over the inner end of the arm $a'$ on the jaw B' and depress the arm, causing the jaw B' to be moved upwardly. When in this position, a hide or piece of leather may be inserted between the jaws of the gripper, and when the lever is released the spring $a^4$ will cause the jaw B' to descend and the teeth $a$ to pierce and consequently retain the leather. A spring, $a^6$, tends to keep the lever B³ out of contact with the arm $a'$. The leather having been gripped, the drum A is caused to rotate in the direction indicated by the arrow in Fig. 1. The leather first passes beneath a smoothing and stretching bar, C. This bar extends lengthwise the drum, outside the same.

It is supported upon swinging levers or arms C', which are fulcrumed or pivoted upon a cross-bar, C², secured to the end portions of the main frame. The arms C' are so formed that they cause the bar C to extend toward the drum in the direction of an approximate radius of the drum. The bar C is shown as open upon its front side and as being slipped over a bar, C³, through which extend rods $b$, rigidly secured to the arms C'. This arrangement admits of the bar C being readily removed and replaced if for any reason it should become necessary so to do.

The arms C' are provided upon their outer portions with weights $b'$, which tend to hold the bar C with a yielding pressure against the leather. These weights are secured upon the levers by set-screws $b^2$, and may be moved into different positions on the levers in order to increase the pressure which the bar shall exert upon the leather. The bar C not only smooths the leather, but stretches it. This is accomplished by grooving the face of the bar nearer the leather with diagonal grooves, as shown more clearly in Fig. 5. These grooves are in two sets, which, starting about midway in the length of the bar, diverge in opposite directions toward the ends of the bar. As the leather passes beneath the bar the grooves spread the former out, or stretch it toward the ends of the drum, causing it to have a smooth flat surface. The leather next passes beneath a funnel or chute, C⁴, extending from a hopper, C⁵, constituting a receptacle from which material with which the leather is to be coated is supplied. The hopper C⁵ is arranged above the drum, and is of approximately the same length as the drum. The funnel C⁴ is also of approximately the same length as the drum. This funnel extends downwardly and inwardly toward the drum, and its lower end is in close proximity to the leather as the latter passes beneath it. Material to be applied to the leather passes down through the funnel C⁴, and is delivered from the funnel at intervals automatically—to wit, every time a piece of leather passes beneath it. I have illustrated the mode of its delivery more clearly in Fig. 3.

C⁶ designates a trap, which is normally closed to prevent the flow of material from the funnel. The trap as here shown consists of a swinging shutter, which is hinged to the rear of the main portion of the funnel, and may swing downwardly toward the front portion of the funnel in such way as to close the lower end of the latter. It is held normally in such position by a spring or springs, $c$, secured at one of their ends to the rear of the main portion of the funnel and at their other bearing against the shutter. When the rotation of the drum brings the leather beneath the lower end of the funnel, the shutter is automatically opened to permit the coating material to pass. This is accomplished by means of a trip, C⁷, here shown as curved in approximately the arc of the drum and secured thereto. This trip extends beyond the end of the drum and follows the curve thereof for a distance. To the shutter of the trap C⁶ is secured a finger, C⁸, which finger extends into such a position that when the trip C⁷ is brought beneath such finger the latter will ride up over the trip and the finger will operate to open the shutter. The trip continues to thus cause the shutter to remain open while the finger C⁸ remains in contact with it. It is intended that such contact shall continue so long as the hide or other piece of leather is passing beneath the lower end of the funnel; but as hides vary in length it is necessary to vary the duration of such contact. I have shown a convenient means for accomplishing this, consisting in providing a sliding section, C⁹, for the trip, (shown more clearly in Fig. 3,) by which the trip may be lengthened or shortened.

Suitable set-screws are employed to secure the sliding section in different positions. The hopper C⁵ is hung, as shown, upon a rotary shaft, C¹¹, journaled in suitable bearings upon the frame of the machine. It is so hung by means of brackets $c'$, secured near one of their ends to the hopper by bolts or otherwise and at their other ends being provided with apertures through which said shaft extends. When desirable, the hopper may be removed by detaching it from the brackets $c'$, disconnecting an eccentric-rod $c^{14}$, and shipping a belt, $c^3$. This may become necessary when it is desired to change the color of the coating material used. Within the hopper is a rotary stirrer, by which the material is mixed. This stirrer comprises a rotary shaft, C¹², and fingers or arms $c^2$, secured to and extending radially from such shaft. The shaft is journaled in suitable bearings on the hopper, and derives motion from a belt, $c^6$, passing around a pulley, $c^7$, on such shaft, and also around a pulley, $c^8$, on the end of the drum-shaft $A'$. I have shown the hopper $C^5$ as provided with another funnel, $C^{13}$. This funnel is arranged at about the center of the length of the hopper and drum, and is not so large as the funnel $C^{14}$. It is opened and closed by a trip, S, in manner similar to the funnel $C^4$. It extends, as shown, downwardly between the rollers $D'$ $D^2$.

It is advantageous that the coating material should be admitted to the funnels at intervals, and not continuously. I have therefore shown a convenient means for accomplishing this result, consisting in movable sides to the hopper arranged so as to open and close the upper ends of the funnels. Such opening and closing is accomplished automatically by the following means:

$c^{14}$ designates an eccentric-rod extending from an eccentric, $c^{15}$, mounted on the drum-shaft $A'$. This rod has, near its other end, a connection with one of the arms of a three-armed lever, $c^{16}$, mounted upon a stud, $c^9$, secured in a bracket, $c^{10}$, upon the hopper $C^5$. A rod, $c^{11}$, secured at one end to another of the arms of the lever, extends to and is connected with the movable side $c^{12}$, which is above the funnel $C^4$, and the rod $c^{14}$ extends from the third of the arms of such lever to the movable side $c^{13}$, above the funnel $C^{13}$. When the shaft $A'$ rotates, the eccentric $c^{15}$ causes the lever $c^{16}$ to be so rocked that the rods $c^{11}$ and $c^{13}$ will cause the movable sides $c^{12}$ and $c^{14}$ to be slid upwardly, so as to open the upper ends of the funnels, and again to be slid downwardly, so as to close such openings. These movements occur at intervals. The upper ends of the outer sides of the funnels are so constructed as to form guides $c^{17}$ for the movable sides in their movements. After passing beneath the lower end of the funnel $C^4$, the leather is brought successively beneath a series of rollers, D $D'$ $D^2$ $D^3$ $D^4$. Five of such rollers are shown; but a greater or a less number may be employed. Certain of such rollers are what we term "distributing-rollers," and certain others "smoothing-rollers."

The distributing-rollers have a rotary motion in a fixed position; but the smoothing-rollers have a reciprocating as well as a rotary motion. All of these rollers are journaled in suitable bearings in the end portions of the frame and bear upon the surface of the hide or leather passing beneath them. They rotate, as shown, in a reverse direction to that in which the drum rotates. Motion is imparted to them by gear-wheels $d$ $d'$ $d^2$ $d^3$ $d^4$, keyed upon certain of their journals and engaging with the gear-wheel $A^5$. The bearings of these rollers are movable. In other words, the rollers can move more freely toward and from the drum, in order to accommodate leather of different thicknesses; but this range of movement is necessarily slight, and is at no time sufficient to cause the gear-wheels $d$, &c., to become disengaged from the gear-wheel $A^5$.

It is preferred that these rollers shall have bearings intermediate of their ends, as the rollers are necessarily quite long. I have shown such an arrangement in Fig. 8, in which $d^5$ designates such bearings, which are arranged upon cross-bars $d^6$, extending between the end portions of the frame. The intermediate bearings may be staggered, or, in other words, those of one roller may be arranged intermediate of those upon the adjacent rollers.

It is advantageous to stagger the bearings, because if the bearings were opposite each other portions of the leather might not be acted upon by the grooves. The rollers bear upon the leather with a yielding pressure. This is accomplished by weighted levers $D^5$, which, being similar to the weighted levers $C'$, which operate in conjunction with the stretching-bar C, I will not further describe. The distributing-rollers are grooved spirally or at inclines, the pitch of such spiral grooves being from the intermediate bearings toward the ends of the rollers. By this means the coating material is caused to be distributed gradually from the center toward the ends of the rollers.

The pitch of the grooves and their dimensions may be varied, as desired, preferably the greatest pitch being upon the rollers beneath which the leather first passes.

In Fig. 8 we have shown more clearly a means for imparting a reciprocating motion to the smoothing-rollers. This means consists in cams $D^6$, mounted upon the journals of the rollers $D'$ $D^4$. Projections $d^7$, rigidly affixed to the frame of the machine, extend into circumferential grooves in the cams. When the cams rotate they are caused by the projections to impart a longitudinally-reciprocating motion to the rollers. The length of such movement is not sufficient, however, to bring the teeth upon the gear-wheels $d'$ and $d^4$ out of engagement with the gear-wheel $A^5$. These rollers, by their combined rotary and reciprocating motion, even and polish the coating material. The last of the rollers will preferably be such a roller.

Beyond the next to the last of the rollers, as shown, is a cleaner or scraper, I, which removes superfluous coating material. This scraper is preferably knife-edged, and extends well beneath the roller. It bears against the coating material upon the leather, and is supported upon arms or brackets $j$, secured to the end portions of the main frame. It is intended to be adjustable, so as to bring it toward and from the leather, in order to accommodate it to pieces of leather of different thicknesses. Such an adjustment is accomplished by means of set-screws $j'$ passing through transverse slots in the scraper (not shown in the drawings) and entering the brackets $j$.

Material scraped from the leather by the scraper passes downwardly over the scraper and falls into a tray or trough, $j^2$, secured to the end portions of the frame, from whence it is conducted by a pipe, $j^3$, to a receptacle or box extending between the end portions of the frame below the drum. This receptacle is shown more clearly in Figs. 1 and 2. When the end of the hide which is secured by the gripper passes beyond the last roller $D^4$, the gripper is automatically opened to release the hide. It is opened by means of a trip, $j^4$, secured to a portion of the main frame, as shown more clearly in Fig. 3. When the drum has rotated far enough, the inner end of the arm $a'$ comes in contact with the trip $j^4$, thereby opening the gripper and releasing the piece of leather. The end of the leather thus released may then be secured by a clamp or clamps, $j^5$, and carried away by any suitable means as fast as delivered from the drum.

During the operation of applying the coating-material the grooved rollers move some of the same off from the hide or piece of leather and deposit it on the surface of the drum, where it will be worked off toward the ends. It is desirable to collect this superfluous material for future use. A convenient means of doing this is shown more clearly in Fig. 6, consisting in a circumferential trough or gutter, $j^6$, formed in the drum near the end thereof, and into which such material will fall. I have shown but one of these gutters; but of course any suitable number may be used.

Material deposited in the gutter may be removed therefrom by a scraper, $j^7$, or scrapers secured upon a receptacle, J. This scraper extends into the gutter and scrapes the material therefrom. The latter then falls into the receptacle J. From the box J the material is returned to the hopper $C^5$. I have shown two modes of so returning it, one of which may be used to advantage when the material is of thin consistency and the other when it is thick and heavy. The former consists of an endless carrier comprising a chain, L, and brackets $l$, secured to the chain. The chain passes around pulleys $C'$ $C^2$, the former arranged adjacent to the hopper $C^5$ and keyed upon the shaft $C^{11}$, from which it derives motion, and the latter mounted upon a short shaft, $C^3$, within the receptacle J, as shown more clearly in Fig. 6. The pulley $C'$ is provided with a hub, $C^4$, upon one side thereof, which surrounds the shaft $C^{11}$. It is constructed, as shown, like a lantern-wheel and has no bearing on the shaft on the side toward the hopper. Material carried up by the endless carrier is deposited from the buckets into a spout, extending into the lantern-wheel, so as to be beneath the buckets and also over the hopper $C^5$. This spout may be secured to one of the brackets, $c'$.

The method I have shown for elevating the heavy material consists of a screw-carrier, O, within a tube, $O'$, one end of which extends into the receptacle J and the other upwardly above the hopper $C^5$. Motion is imparted to the screw by means of a gear-wheel, $e$, mounted on the shaft $C^{11}$ and engaging a gear-wheel, $e'$, on the upwardly-extending end of the screw. The material elevated by the screw is conveyed through a spout, $e^2$, into the hopper $C^5$.

It is quite essential that the drum should be thoroughly cleaned after a hide or piece of leather has been removed from it. For effecting such cleaning we prefer that the drum should rotate through a tank, $J'$, located beneath the drum and secured to the main frame. This tank contains naphtha or other suitable liquid for "cutting" the coating material.

We provide a cleansing device or cleansing devices within the tank to assist in cleansing the drum. Two kinds of devices are shown—namely, wipers and scrapers—but of course it is not essential that both should be used. The wipers may be rotary, as shown more clearly in Figs. 1 and 2, or they may be stationary, as shown in Fig. 10. The rotary wipers will preferably consist of rolls $J^2$ $J^7$, covered with a suitable wiping material, $J^3$—such, for instance, as felt. These wipers rotate in reverse direction to the direction of rotation of the drum, and have motion imparted to them by a system of gearing arranged within the tank. Such system derives motion from a gear-wheel, $J^4$, mounted on a shaft, $J^5$, extending through a stuffing-box, $J^6$, on the main frame, and meshing with the gear-wheel $A^5$. Preferably, the rotary wipers will have yielding bearings, as shown in Fig. 2, consisting of blocks $e^5$, in which the roller-journals are mounted, arranged in housings $e^6$, in which are springs $e^7$, bearing against the blocks $e^5$. By this means the rollers will bear with a yielding pressure against the drum. It is advantageous that one of the wipers—as, for instance, the wiper $J^7$—should be above the naphtha or other liquid, so as to constitute a drying-wiper. Liquid taken up by this wiper may be scraped or squeezed therefrom by a scraper, $J^8$, hinged to the tank and bearing against the wiper. The degree of pressure which the scraper exerts may be varied by means of a set screw or screws, $J^9$, as shown.

Instead of using a rotary drying-roller a box, $J^{10}$, containing cotton-waste or other suitable absorbing material, may be arranged lengthwise the drum in such position that the absorbing material will press against the drum. I have shown such an arrangement in Fig. 3. A scraping-knife, as $J^{11}$, may be used, as in Fig. 10, or the wipers may be stationary, as $J^{12}$ or $J^{13}$, same figure. When the naphtha or other liquid in the tank becomes too thick for use it may be conducted off through a spout, $J^{14}$, into the receptacle J, and from thence to the elevated hopper, as described.

I have shown in Fig. 4 a plate, $J^{15}$, bolted to the end of the tank $J'$ and extending within the drum. This plate is curved upon its lower side, and its upper side is approximately coincident with the top of the tank. One of these is to be arranged at each end of the tank. Coating material which may pass over the portion of the drum which is uppermost will fall down between these plates and the ends of the tank, where, not being subjected to agitation, it will not readily mix with the naphtha.

P designates a lever. This lever has connected to its lower end a rock-shaft, $P'$, journaled in bearings on the frame. This rock-shaft has mounted on it a yoke, $P^2$, extending into a circumferential groove in the male portion $a^{11}$ of the driving-clutch. When the lever is moved in one direction the yoke causes the engagement of the clutch, and the machine will then be started. When moved into such position the lever may be retained by a retaining device consisting of a notched arm, $P^3$, extending from the main frame. It is intended that the machine shall be automatically stopped when the drum in its rotation brings the gripper again opposite the table B in position to receive another piece of leather. This is effected by means of a trip, $P^4$, (shown as in the form of a bell-crank lever,) fulcrumed upon the main frame and having one arm extending into close proximity to the lever P and the other into the path traversed by a projection, $p$, on the drum. (See particularly Figs. 1 and 2.) When by the rotation of the drum the projection is caused to strike the adjacent arm of the trip-lever $P^4$, the latter is so rocked as to bring its other end into contact with the lever P, whereby the latter is moved out of the notch on the retaining device $P^3$, and is quickly retracted by a spring, $p^2$, whereby the male portion $a^{11}$ of the clutch is shifted and the machine stopped.

We do not wish to be understood as limiting ourselves to the particular form and arrangement of parts shown and described, as these may obviously be varied without departing from the spirit of our invention.

What we claim as our invention, and desire to secure by Letters Patent, is—

1. The combination, with a rotary drum, of a gripper for leather or similar material and a smoothing or spreading bar provided with diverging grooves, substantially as specified.

2. The combination, with a rotary drum, of a gripper for leather or similar material and a smoothing-bar acting with a yielding pressure on the leather or similar material, substantially as specified.

3. The combination, with a rotary drum by which leather or similar material is supported, of a receptacle for coating material for the leather provided with a discharge-opening, and a trap normally closing said opening, substantially as specified.

4. The combination, with a rotary drum by which leather or similar material is supported, of a receptacle for coating material for the leather provided with two discharges or chutes, one of which is shorter than the other, substantially as specified.

5. The combination, with a rotary drum by which leather or similar material is supported, of a receptacle for coating material having a discharge-opening, a trap for normally closing said discharge-opening, and a trip for opening said trap at intervals, substantially as specified.

6. The combination, with a rotary drum by which leather or similar material is supported, of a receptacle for coating material for the leather having a discharge-opening, a trap for normally closing said discharge-opening, and an adjustable trip for opening said trap at intervals, substantially as specified.

7. The combination, with a rotary drum by which leather or similar material is supported, of a receptacle for coating material for the leather provided with a discharge-opening and a movable part of the receptacle operated automatically to admit the flow of coating material to the discharge-opening at intervals, substantially as specified.

8. The combination, with a rotary drum by which leather or similar material is supported, of a receptacle for coating material for the leather detachably supported above the drum, substantially as specified.

9. The combination, with a rotary drum by which leather or similar material is supported, of a receptacle for coating material for the leather and a stirrer arranged in said receptacle, substantially as specified.

10. The combination, with a rotary drum by which leather or similar material is supported, of rollers having spiral or inclined grooves for distributing coating material upon the leather, substantially as specified.

11. The combination, with a rotary drum by which leather or similar material is supported, of distributing-rollers provided with diverging spiral or inclined grooves, the grooves upon one roller being of a different pitch from those upon the other, substantially as specified.

12. The combination, with a rotary drum, of rollers provided with staggered bearings intermediate of their ends, substantially as specified.

13. The combination, with a rotary drum by which leather or similar material is supported, of rollers for applying coating material to the leather and an adjustable scraper for removing superfluous coating material from the leather, substantially as specified.

14. The combination, with a rotary drum by which leather or similar material is supported, of rollers for applying coating material to the leather, a scraper for removing superfluous coating material, and a receptacle for the material so removed, substantially as specified.

15. The combination, with the rotary drum provided with a circumferential gutter or trough, of a scraper extending into such gutter or trough for removing material therefrom and a receptacle for the material so removed, substantially as specified.

16. The combination, with a rotary drum upon which leather or similar material is supported, of a receptacle for coating material for the leather, a box, as J, for receiving superfluous coating material, and a carrier for conveying such superfluous material to said receptacle, substantially as specified.

17. The combination, with a rotary drum by which leather or similar material is supported, of a tank below the drum for naphtha or other suitable liquid, in which the drum rotates, and a cleaner in the tank for cleaning the drum operating on the portion of the drum unoccupied by the leather or similar materials, substantially as specified.

18. The combination, with a rotary drum, of a tank below the drum for naphtha or other suitable liquid, in which the drum rotates, and rotary cleaners arranged in the tank and rotating in a reverse direction to the direction of rotation of the drum, substantially as specified.

19. The combination, with a rotary drum, of a tank below the drum for naphtha or other suitable liquid, in which the drum rotates, cleaners in the tank for cleaning the rollers, and a drying-wiper, substantially as specified.

20. The combination, with a rotary drum, of a tank in which said drum rotates and plates, as $J^{15}$, secured to the tank and extending into the drum, substantially as specified.

21. The combination, with a rotary drum, of a stop-motion operating to stop the rotation of the drum at each complete rotation thereof, substantially as specified.

22. The combination, with a rotary drum by which leather or similar material is supported, of a receptacle for supplying coating material to the leather, rollers for applying the coating material to the leather, and a stop-motion operating to stop the operation of these parts at each complete rotation of the drum, substantially as specified.

RICHARD G. WOOD.
PATRICK REILLY.

Witnesses:
MICHAEL T. BARRETT,
FRANK D. MOCKLER.